United States Patent
Stengler et al.

(10) Patent No.: US 10,542,127 B2
(45) Date of Patent: Jan. 21, 2020

(54) FAULT TOLERANT COMMUNICATION IN A DISTRIBUTED SYSTEM

(71) Applicant: SAP SE, Walldorf (DE)

(72) Inventors: Jan Stengler, Walldorf (DE); Jonathan Dees, Heidelberg (DE); Martin Weidner, Stuttgart (DE)

(73) Assignee: SAP SE, Walldorf (DE)

( * ) Notice: Subject to any disclaimer, the term of this patent is extended or adjusted under 35 U.S.C. 154(b) by 156 days.

(21) Appl. No.: 15/696,874

(22) Filed: Sep. 6, 2017

(65) Prior Publication Data

US 2019/0075194 A1 Mar. 7, 2019

(51) Int. Cl.
| | |
|---|---|
| *H04L 12/26* | (2006.01) |
| *H04L 29/14* | (2006.01) |
| *H04L 12/24* | (2006.01) |
| *H04L 29/06* | (2006.01) |
| *H04L 12/703* | (2013.01) |

(52) U.S. Cl.
CPC .......... *H04L 69/40* (2013.01); *H04L 41/0654* (2013.01); *H04L 45/28* (2013.01); *H04L 69/14* (2013.01)

(58) Field of Classification Search
None
See application file for complete search history.

(56) References Cited

U.S. PATENT DOCUMENTS

| | | | | |
|---|---|---|---|---|
| 2001/0033556 A1* | 10/2001 | Krishnamurthy | ....... | H04L 45/02 370/329 |
| 2001/0034793 A1* | 10/2001 | Madruga | ............. | H04L 12/1854 709/238 |
| 2003/0177263 A1* | 9/2003 | Robinson | ................ | H04L 45/00 709/239 |
| 2003/0202469 A1* | 10/2003 | Cain | ........................ | H04L 45/20 370/230 |
| 2004/0243580 A1* | 12/2004 | Markki | .................... | H04L 12/18 |
| 2005/0041575 A1* | 2/2005 | Kam | .......................... | H04J 3/14 370/216 |
| 2006/0239216 A1* | 10/2006 | Chen | ...................... | H04L 45/124 370/310 |
| 2011/0022882 A1* | 1/2011 | Jaehde | ................. | G06F 11/2023 714/4.1 |
| 2012/0117268 A1* | 5/2012 | Shaffer | .................... | H04L 45/24 709/238 |
| 2012/0134361 A1* | 5/2012 | Wong | ..................... | H04L 45/021 370/392 |
| 2014/0313885 A1* | 10/2014 | Wen | ........................ | H04W 40/02 370/225 |
| 2017/0083387 A1* | 3/2017 | Prasad | ..................... | G06F 9/546 |

* cited by examiner

*Primary Examiner* — Atique Ahmed
(74) *Attorney, Agent, or Firm* — Sterne, Kessler, Goldstein & Fox P.L.L.C.

(57) ABSTRACT

Disclosed herein are system, method, and computer program product embodiments for fault tolerant communications in a distributed system. An embodiment operates by determining a failure of a first node of a cluster of a plurality of nodes. Prior to the failure, a second node transmitted a first message to the first node. The second node determines content corresponding to the first message. A third node to which to provide the content of the first sub-task is identified. A second message, including content corresponding to the first message, is transmit to the third node.

20 Claims, 7 Drawing Sheets

FAULT TOLERANT COMMUNICATION IN A DISTRIBUTED SYSTEM

BACKGROUND

As the number of nodes within a distributed system of computers increases, so too increases the likelihood of failure of one or more of those nodes. Failures can wreak havoc on a distributed system. For example, failures can cause data to be lost and/or delays in processing. Recovery from such failures is often time consuming and resource intensive, requiring, for example, halting processing across all system nodes, rolling back the nodes to a previous state, and then restarting the system. While this is occurring, tasks and processes may be delayed, thereby interfering with and disrupting workflow.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for fault tolerant communication in a distributed system.

Figure 1:
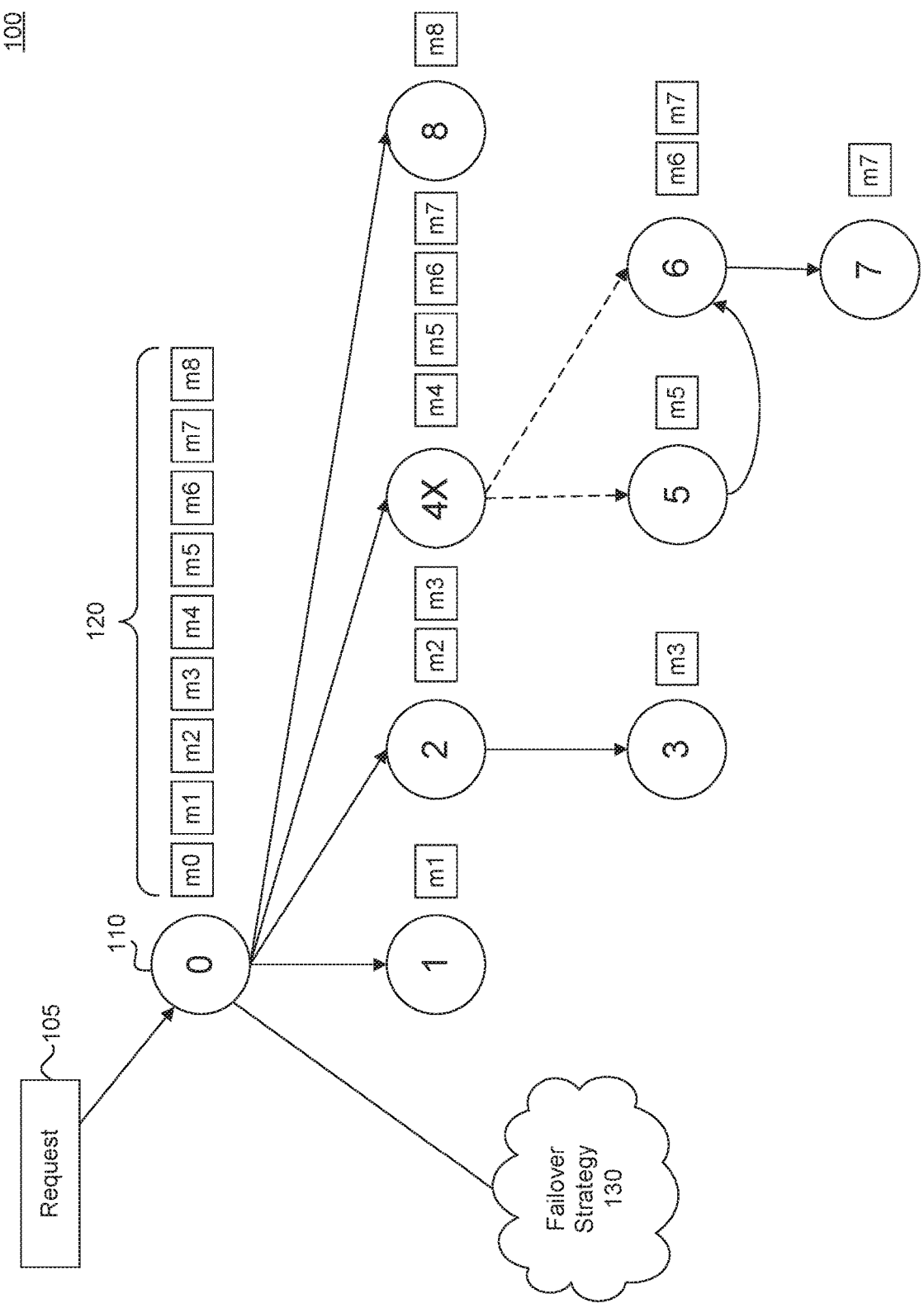
FIG. 1 is a block diagram illustrating example fault tolerant communications in a distributed system, according to some embodiments.
Figure 2A:
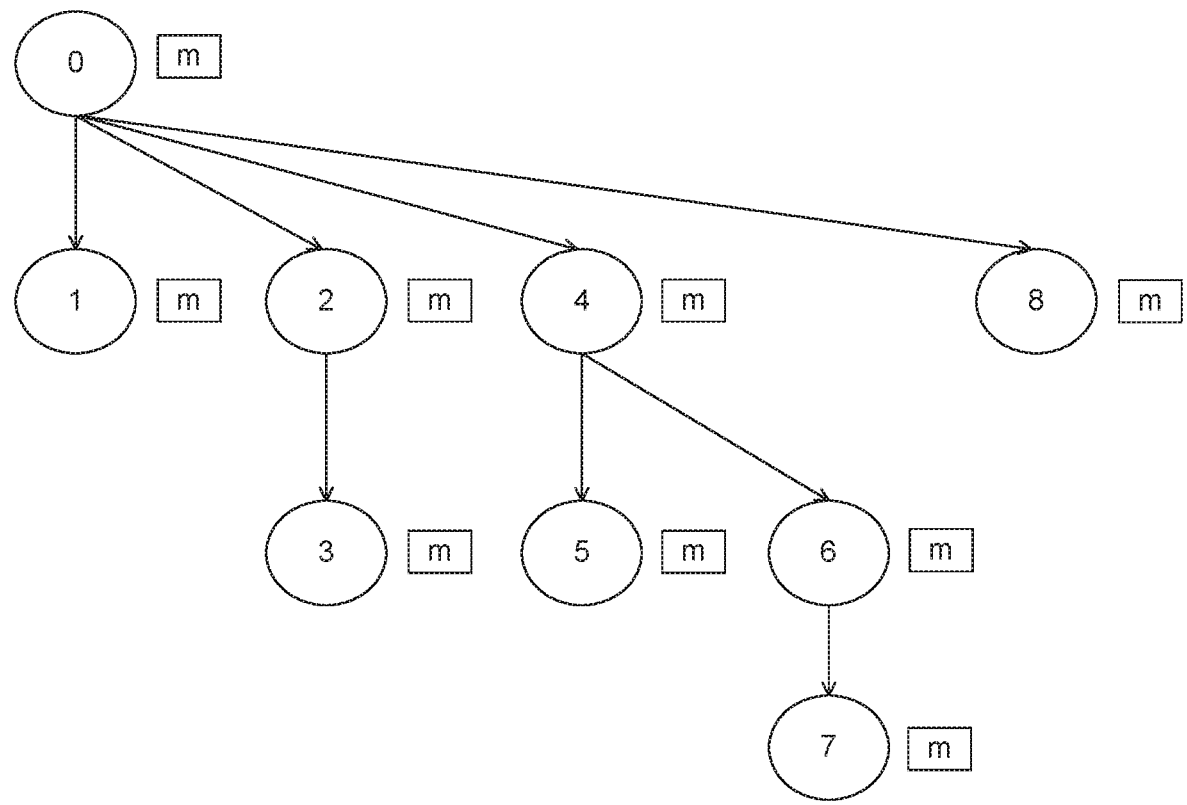
FIGS. 2A-D illustrate example embodiments of various communication protocols used by a distributed system with fault tolerant communications.
Figure 2B:
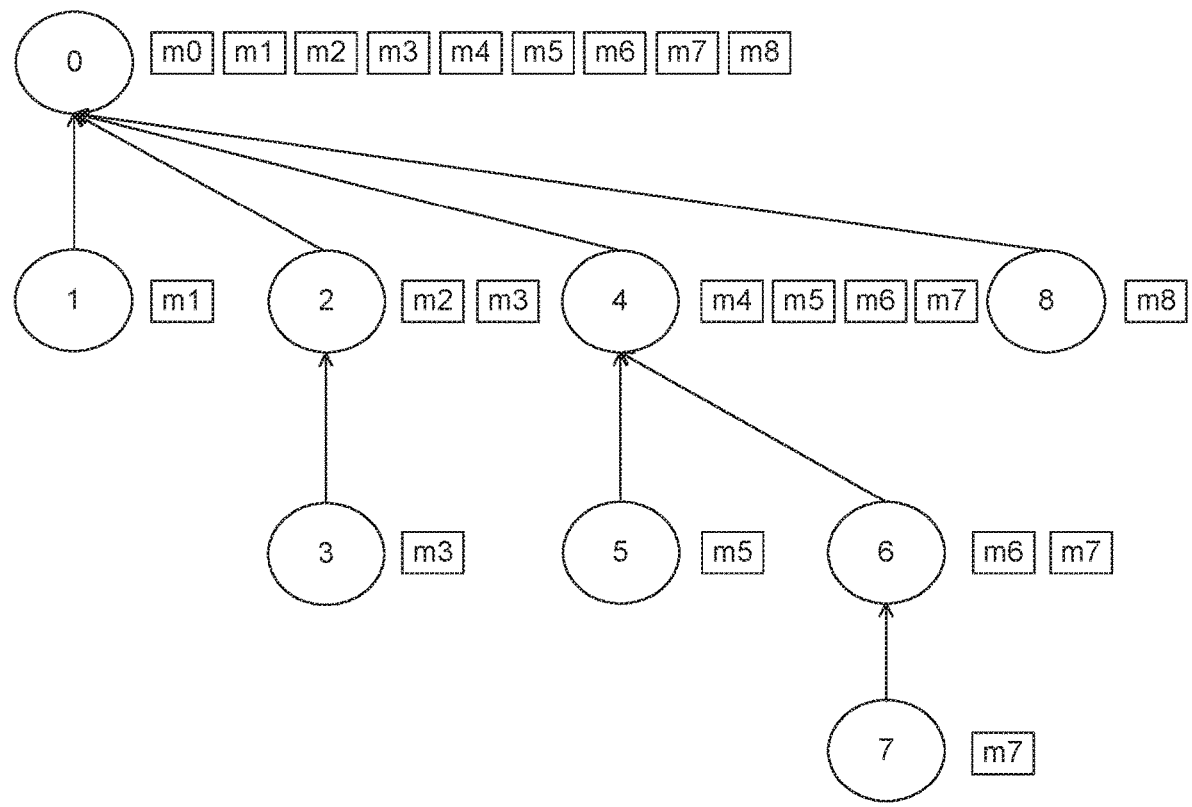
Figure 2C:
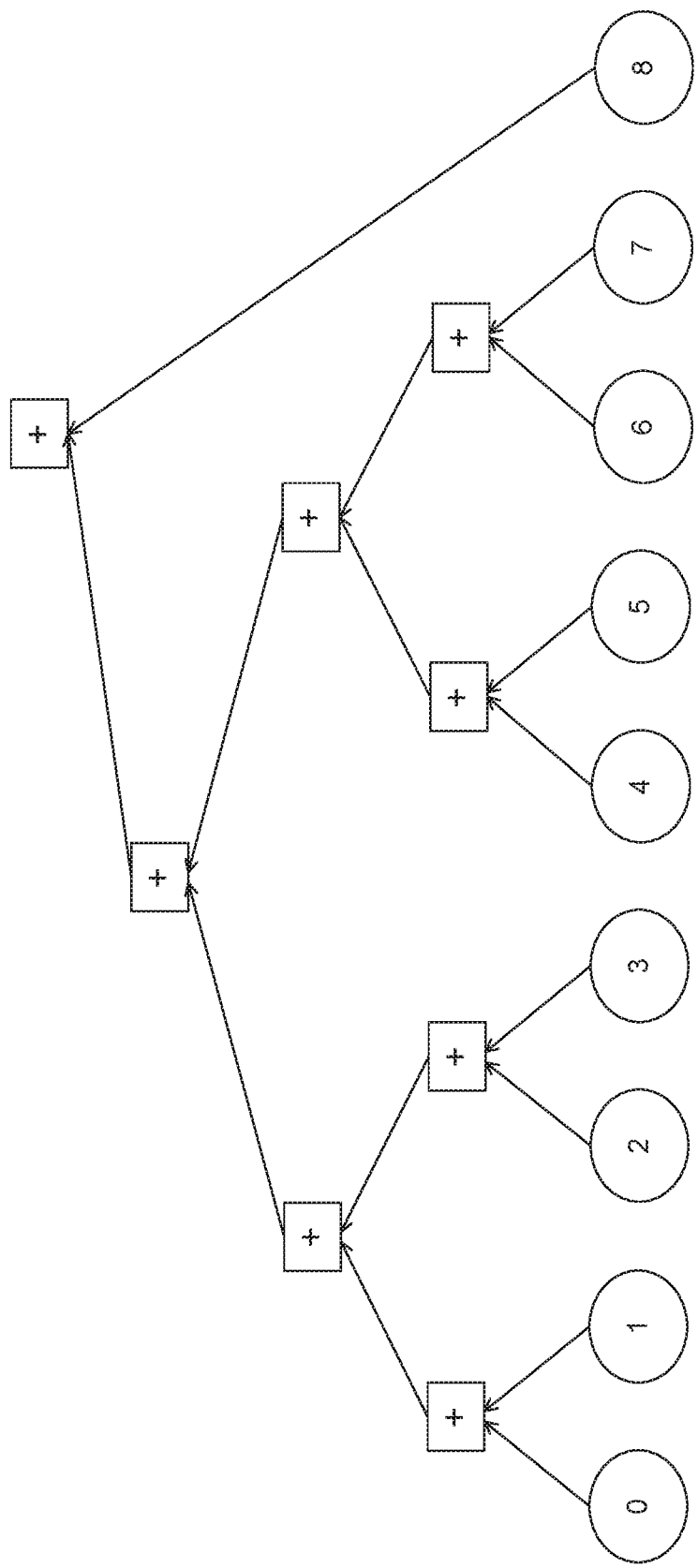
Figure 2D:
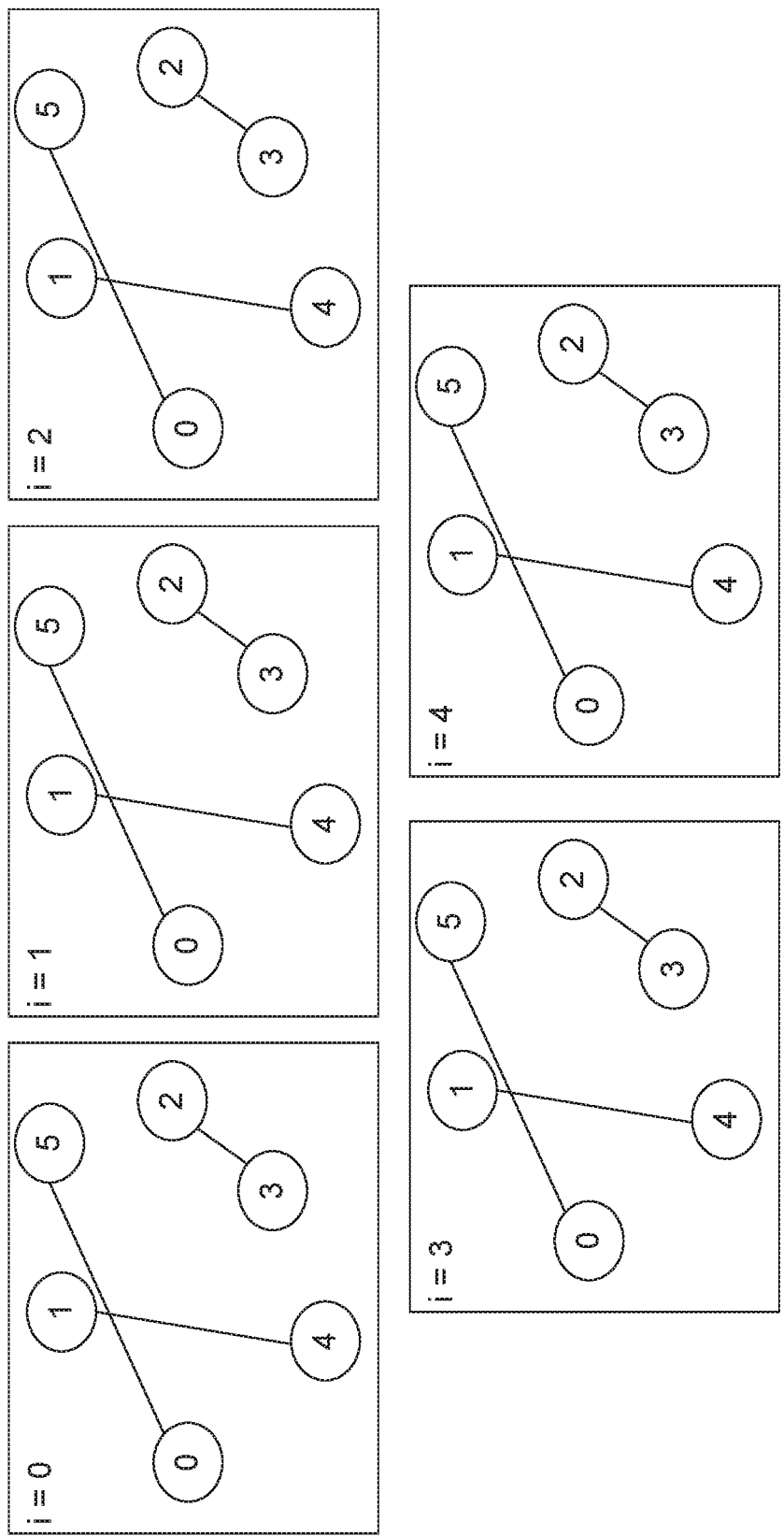

FIG. 1 is a block diagram illustrating example fault tolerant communications in a distributed system 100, according to some embodiments. System 100 includes nodes 110 (labeled 0-8) that are arranged in a distributed cluster. While nine nodes 110 are shown in the example of FIG. 1, those skilled in the relevant art(s) will appreciation that distributed systems may include any number of nodes 110.

Each node 110 may be in communication (one way or two-way) with one or more other nodes 110 of the cluster or system 100 depending on which communication algorithm is being used within the cluster. Each node 110 may represent a computing device or a computing system, including one or more hardware processors. Example computing devices which may operate as nodes 110 include a laptop, desktop, server, appliance, a component of the Internet of Things, and/or a mobile device, to name just some examples. In an embodiment, system 100 may include a combination of different devices which are operating as nodes 110.

In an embodiment, the cluster of nodes 110 may be arranged to perform one or more tasks or operations as indicated by request 105. For example, one or more nodes 110 of the cluster may receive a request 105 to perform a transaction or operation, such as a query operation or other transaction involving data of a database. In an embodiment, processing request 105 may be received by every node 110 of the cluster. An example request 105 may include a long-running process that executes over an extended period of time (e.g., such as several hours) across a combination of nodes 0-8. Based on the processing performed by the nodes 0-8, a result may be stored, used to perform another operation, and/or returned to the requester or other designated entity.

In an embodiment, node 0 may divide the processing request 105 into a number of sub-tasks, operations, or processes. Or, for example, request 105 may already be divided into a number of sub-tasks when received by node 0. In an embodiment where each node 110 of the cluster receives request 105, or a copy thereof, there may be no distribution from Node 0 of messages 120 to other nodes, or there may be other inter node communication of messages 120.

Node 0 may distribute messages 120 (labeled m1-m8) to the other nodes 1-8 of the cluster. Messages 120 may include data, temporary results, sub-tasks, values, instructions, and/or other communications (to name just some examples) between two or more nodes 110 of a cluster. In an embodiment, the content of messages 120 may pertain to the performance of operations related to request 105. In other embodiments, the distribution of messages 120 may be performed by additional or other nodes 110 based on which communication algorithm is being used within the cluster. In the example shown, the messages 0-8 may correspond to similarly numbered nodes 0-8.

In an embodiment, request 105 may be divided into a particular number of sub-tasks based on the number of operational or available nodes 110 (i.e., nine sub-tasks or messages 120 for nine nodes). Or, for example, request 105 may be divided into sub-tasks regardless of the number of nodes 110 (e.g., nine messages 120 regardless of how many nodes 110 are available or operational). In an embodiment, either more sub-tasks may exist than there are nodes 110, or fewer sub-tasks may exist than there are available nodes 110. In either scenario, the coordination of which sub-tasks are processed by which nodes 110 may be accomplished through messages 120. For simplicity, and without limitation, as described herein with respect to system 100, it is assumed that each node 0-8 executes or processes at least one sub-task of request 105. Also, in some embodiments, it is assumed that each node 0-8 handles or processes a correspondingly numbered message m0-m8.

As just noted, messages 120 may include processing functionality or values to be received and handled by each node 0-8 which may be related or necessary to fulfilling request 105. For example, message m3 may indicate data and/or operations related to performing a third task. Message 3 may be distributed to node 3, as shown in the example of FIG. 1. In another embodiment, a particular node may receive multiple messages with corresponding tasks or data. For example, node 2 may receive both messages m2 and m3 from node 0. Node 2 may then perform processing functionality related to both messages or forward message m3 to node 3 for processing (as shown in the example of FIG. 1).

In an embodiment, m3 may depend or wait for node 2 to complete its processing of m2 before node 3 can process the task corresponding to m3. Or, for example, the result of processing m2 by node 2 may be combined with the result of m3 as calculated by node 3. Or, node 2 may simply be a relay point used for communications between node 0 and node 3 (e.g., due to a security configuration or network topology).

Nodes 110 may communicate with one another using any one or combinations of communication protocols or algorithms. Different communication algorithms may produce or be the product of different network topologies. The communication arrangement shown in system 100 is an example of a scatter communication algorithm. However, in other embodiments, nodes 110 may use or be arranged or configured into any other or combination of communication algorithms. Example communication algorithms include: broadcast, scatter, gather, reduce, and all-to-all, to name just some examples. Example embodiments of several different communication protocols are shown in FIGS. 2A-2D.

In broadcast communication (FIG. 2A), a root node (Node 0) or process may deliver a message to every other node of the cluster, or at least every node that is participating in the operation or transaction of request 105. In broadcast communication, the same message may be communicated to every other node. Accordingly, rather than having messages m0-m8, there would only be a single message (m0) that is broadcast from node 0 to each of nodes 1-8. As shown, the communication from Node 0 to other nodes may occur directly from Node 0 to Node 4, or indirectly through another node (Node 0 to Node 5).

In scatter communication, as shown in FIG. 1, a root node (0) may deliver an individual, unique, or different message (m1-m8) to the other nodes 111-118 of the cluster (m0 may be for node 0). This communication or transmission of messages 120 from node 0 to the remaining nodes 1-8 may be performed directly (e.g., m2 directly from node 0 to node 2) or indirectly (communication of m3 from node 0 to node 3, by way of node 2).

In gather communication (FIG. 2B), many nodes may send different messages to one root process. If nodes 0-8 are communicating in gather communication, then for example, messages 1-8 may originate with nodes 1-8, which may be sending them directly or indirectly (by way of other or intervening or relay nodes) to root node 0. In an embodiment, each node 110 in a gather communication would have at least one message 120 that would be transmit or relayed to the root node or process.

In reduce communication (FIG. 2C), the set of messages received (e.g., by a root process) from one or more nodes of a cluster may be reduced into a smaller set of messages. For example, in reduce communication, each node 1-8 may have at least one message 120 to be sent to node 0. The difference between reduce and gather may be that node 0 does not gather (or retain) the messages 120 it receives from the different nodes 1-8. Instead, several nodes or each node may perform one or more operations to reduce this list or accumulation of messages or data into a smaller list or abbreviated list.

In an embodiment, messages 120 received by node 0 may be associated with a number or value. Node 0 may then reduce this list of numbers by using one or more different reduce operations such as: sum, product, minimum and/or maximum numbers from the received messages 120. However, in other embodiments, other operations may be performed by root node 0 to reduce the received messages 120.

In all-to-all communication (FIG. 2D), each node 0-8 may be directly or indirectly communicating with every other node 0-8. In an embodiment, the different messages 120 exchanged between any two nodes in all-to-all communication may be unique. For example, a message 120 transmit from node 1 to node 2 may be different from a message 120 transmit from node 1 to node 0.

The example system 100 of FIG. 1 includes nine nodes 110. However, as noted above, it is understood that the distributed cluster of system 110 may include any number of nodes 110 (including hundreds or even thousands—or more—of interconnected, inter-communicating computing devices communication with each other using one or more communication algorithms). Similarly, any particular node 110 of the cluster may be performing operations associated with one or more different requests 105 or sub-tasks (via messages 120), or may be part of multiple clusters. As the number of nodes 110 performing operations or sub-tasks related to fulfilling requests 105 increases, so too increases the likelihood of a failure of one or more of those nodes 110.

Failures in distributed systems can substantially increase processing and/or time cost in completing requests. For example, a failure at any node in a general computing cluster may require a system to stop the execution of many or even all of the nodes that may be performing requests or sub-tasks. The system would then have to identify a previously stored checkpoint (e.g., a stable state that may have existed prior to the occurrence of the failure). The system would need to then rollback the state of the nodes to the previous checkpoint. Then, any intervening operations would have to be re-executed prior to the current operation or sub-task being processed.

This process may require substantial overhead in terms of processing power, computing devices, and time. For example, such a system would need to periodically save checkpoint states of the nodes, thereby consuming both processing capacity and storage capacity, as well slowing down ongoing processing. Then, for example, when a failure does occur, the rollback process as just described must be performed before system restart. Then, any previously executed operations would have to be re-executed thus consuming even more resources and taking more time.

One alternative approach to the rollback approach is to use redundancy. Redundancy, however, has its own drawbacks. Redundancy may involve multiple nodes performing the same tasks or sub-tasks. Then, for example, if one of the nodes fails, the redundant node may take over for the failed node. However, having multiple nodes perform the same tasks also wastes processing resources (which could otherwise be allocated to perform other sub-tasks and thus speed up system or task processing). For example, if no failure occurs, the system expended (and wasted) time and processing resources preparing for a contingency that never occurred. Without redundancy, those processing resources could have been otherwise saved or reallocated in a productive manner.

In some embodiments, system 100 provides for fault-tolerant communications between nodes 110 regardless of which communication algorithm (broadcast, scatter, gather, reduce, all-to-all) is being used. System 100 achieves fault tolerance without the wasting of resources described above with respect to rollback and redundancy. Through providing fault-tolerance in the manner described herein, system 100 is failure resistant and enables communication to continue between Nodes 110, and processing to continue, even when failures occur. In an embodiment, this may have the effect of decreasing the time between a failure and resumption of processing from the point of failure. The failures may include hardware and/or software failures that occur at any or multiple nodes 110. In an embodiment, the failures may include fail-stop failures in which data associated with a task or process is lost, a node stops responding, or another unrecoverable error occurs.

For purposes of readability, and not limitation, the fault-tolerance embodiments of this disclosure will be described primarily in terms of scatter communication between nodes 0-8 (with node 0 operating as the root node). However, one skilled in the relevant art(s) would understand that similar fault tolerant techniques may be applied regardless of which communication algorithm(s) are being used.

In some embodiments, node 0 may be a coordinator, head, or root node. In an embodiment, node 0 may be pre-selected or pre-configured as a coordinator node, or may be the root node 0 of the cluster. As the root node, Node 0 may distribute messages 120 and/or receive messages from the various other nodes depending on the type of communication being used by the cluster of nodes (in some communication algorithms, such as all-to-all, no node may function as the root).

As described above, in scatter communication, root node 0 may distribute unique messages 120 to each node 1-8 of the cluster. Each message 120 may correspond to a sub-task, or process to be performed by the respective node relative to completing or processing request 105. For example, m2 may indicate what operation(s) or sub-task(s) node 2 is to perform (on which data). Also, different nodes (e.g., nodes 2, 4, 6) may be tasked with forwarding messages 120 on to other nodes of the cluster. For example, node 2 may receive both messages m2 and m3 from node 0. Node 2 may then forward or transmit message m3 to node 3 for processing.

As just described, one or more nodes 0-8 may fail. Assume, in the example of FIG. 1, that a failure occurred with respect to node 4. In some embodiments, rather than stopping the execution of the processing by the remaining (un-failed) nodes 0-3 and 5-8 of the cluster, node 0 (the root node in the example) may identify which messages 120 were transmit to the failed node (node 4). In an embodiment, system 100 may also identify which other nodes may have been affected by the failure (in the ongoing example, nodes 5, 6, 7 would be identified as having been affected, as they were to receive messages m5-7 from node 4, respectively).

Then for example, the messages previously transmitted to node 4 may be re-transmit to whichever node(s) may be taking over for the failed node according to a failover strategy 130. In the example of FIG. 1, failover strategy 130 may indicate that node 5 is to replace node 4 in case of node 4. Messages m4-7 may then be re-transmit by node 0 to node 5.

Thus, rather than rolling back the state of the unaffected nodes 0-3 and 5-8 because of a failure of a single node (4), the unaffected nodes may continue processing their sub-tasks from their associated messages. In an embodiment, the state of the system 100 may be recoverable to the point before the communication of the message(s) to the failed node, at which point the system was known to be in a stable state. For example, the division of request 105 into distinct sub-tasks and messages 120 may provide an inherent checkpoint for communications and potential failures.

Failover strategy 130 may include a strategy that determines how the nodes 110 of system 100 respond when one or more nodes 110 fail. Failover strategy 130 may be static or dynamic. A static failover strategy 130 may explicitly designate which node(s) are to takeover for which other nodes in case of failure. For example, a static failover strategy 130 may indicate that node 5 is the backup to node 4, node 6 is the backup to node 5, and node 7 is the backup to node 6. Failover strategy 130 may take into account what happens in the case of failure of any or any combination of nodes 110.

A dynamic failover strategy 130 may indicate a criteria on how to choose which node(s) are to take over the processing when one or more other nodes fail. For example, a dynamic failover strategy 130 may indicate that whichever node has the closest network distance and/or greatest available processing or memory capacity will takeover in case of a failure of another node. In the example shown, node 5 may have the greatest available resource space. However, in another embodiment, node 3 or another node (depending on conditions and their respective states) may take over for node 4.

In another embodiment, failover strategy 130 may include a hybrid approach, combining features of static and dynamic. For example, failover strategy 130 may indicate that one of nodes 113, 115, and 116 will take over for node 114 in case of failure, and that the node will be selected based upon their respective states such as available processing or memory capacity. Or that preference for takeover would be given to the closest available downstream node from the failed node. For example, nodes 5, 6, and 7, may be downstream from node 4, while node 3 is not.

When a node 110 fails, the remaining nodes of the system 100 may be notified of the failure. In an embodiment, nodes 110 may communicate with one another using an implementation of message passing interface (MPI). MPI is an example paradigm that may be used for high performance computing applications to facilitate communication between nodes. In an embodiment, MPI may be configured (through extensions) to detect failures (such as fail-stop errors, similar to that described herein).

In an embodiment, MPI may determine whether a node is stable, processing, or in a failure state. Then, for example, upon detection of a failure, the remaining or effected nodes of system 100 may be notified of the failure. For example, any non-failed entities in a distributed system may be notified of a failure occurring at any other failed entities. MPI executes in the nodes 110, and is an example of a fault tolerant broadcast system which may be used to provide for the transmission or communication of packets between nodes 110.

The notification of a failure may prompt nodes 110 to implement failover strategy 130. In an embodiment, each node 110 may be provided with a copy of failover strategy 130 and may be notified as to which node(s) 110 failed using MPI. Based upon the notification and failover strategy 130, the remaining active nodes would know which nodes are still operational and are responsible for taking over for the failed node. The messages 120 previously transmitted to the failed node, may then be re-transmitted to the nodes which are responsible for the recovery process.

In an embodiment, failover strategy 130 may be determined based on which request 105 is being processed and/or which communication algorithm is being used by nodes 110 to process request 105. Unlike other systems, however, failover strategy 130 as employed by nodes 110 does not require a rollback to a previously checkpointed or safe state (i.e., prior to the occurrence of an error). In an embodiment, the transmission of different messages 120 to different nodes 110 may act as a sandboxing or isolation in case of failures or other errors. Thus, when a failure of node 4 is detected, the root or coordinating node 0 (in scatter communication) may determine what messages 120 (or sub-tasks) failed, and then only those messages are resent. The remaining nodes may continue processing as they were. In an embodiment, this may improve overall system performance by reducing the burden of periodically storing checkpoint information to account for potential failures. Further, both time and processing capacity are saved because the remaining (unaffected) nodes are neither stopped nor rolled back.

For example, rather than rolling back the states of nodes 0-3 and 5-8 because of the failure of a single node 4, instead the unaffected notes 0-3 and 5-8 operate to resend messages m4, m5, m6, and m7 that were previously sent to node 4. Upon receiving messages m4-m7, node 5 may process messages m4 and m5, and forward or transmit m6 and m7 to nodes 6 and 7, respectively. In another embodiment, the processing of m4 may be split between two or more nodes (e.g., node 5 and node 6). No deadlock occurs as the failed node is known and the failover strategy 130 has been predetermined.

Accordingly, system 100 avoids the need for employing redundancy and wasting resources performing duplicative sub-tasks. This allows the overall operation of request 105 to be completed faster (as more processors are available to process the messages 120 or sub-tasks associated with the request). However, in some embodiments, the fault tolerant system 100 using the failover strategy discussed herein may be combined with conventional redundancy and/or rollback approaches in particular implementations.

Figure 3:
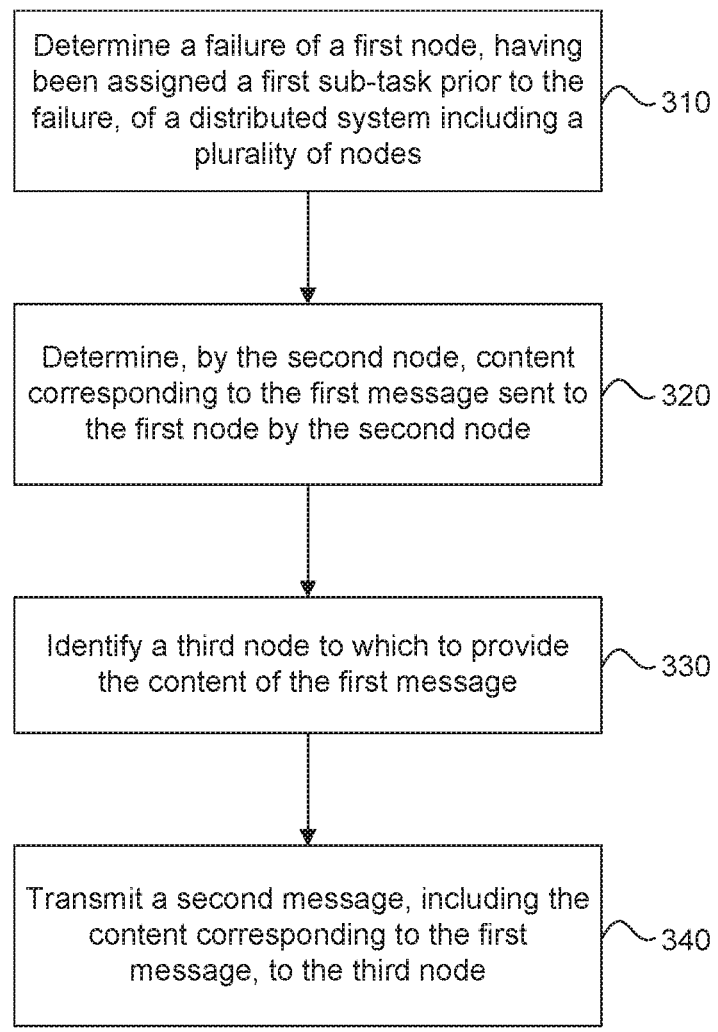
FIG. 3 is a flowchart illustrating a process for fault tolerant communications in a distributed system, according to some embodiments.

FIG. 3 is a flowchart for a method 300 for fault tolerant communication in a distributed system, according to an embodiment. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art. Method 300 shall be described with reference to FIG. 1. However, method 300 is not limited to that example embodiment.

In 310, a failure of a first node of a distributed system including a plurality of nodes is detected or otherwise determined. For example, in FIG. 1, node 0 may determine or detect that node 4 has failed. Prior to the failure, node 4 may have been assigned or received a first message or sub-task of a plurality of sub-tasks associated with the processing of request 105. The content of first message (m4) may have been assigned or otherwise transmitted to node 4, by node 0. The failure of node 4 may also be communicated to or otherwise detected or determined by the other remaining nodes 110 of the cluster responsible for processing request 105.

As referenced above, in an embodiment, a message passing interface (MPI) may be used to support communications between nodes 110. MPI may be configured to detect failures and transmit or otherwise communicate notifications of such failures amongst nodes 110 of a cluster. For example, if node 4 fails, the failure may be detected by MPI, and nodes 0-3, and 5-8 may be notified (via MPI) of the failure. In another embodiment, if node 8 was not involved in processing a message 120 or sub-task associated with request 105, then only nodes 0-3 and 5-7 would be notified of the failure via MPI.

In 320, a second node determines content corresponding to the first message sent to the first node by the second node. For example, node 0 may determine that message m4 including a sub-task was sent to node 4. However, node 0 may also determine that messages m5-7 were also transmitted to node 4 for processing or forwarding on to nodes 5-7 respectively. In another embodiment, if multiple nodes 110 transmitted messages 120 to the failed node (node 4), then those nodes would also identify which messages 120 were sent to the failed node (either for processing or forwarding). Each message 120 may include content which may include operations, data values, sub-tasks, or other communications between two or more nodes 110 related to processing request 105.

In 330, a third node to which to provide the content of the first message is identified. For example, based on failover strategy 130, node 0 may determine that node 5 is designated to take over for node 4 in case of failure. In an embodiment, each node 110 may have access to or a copy of failover strategy 130. As noted above, each node involved in processing of the request 105 may be notified of the failure of a node. Then, for example, when any node 110 fails, each node 110 is aware of how communication between the nodes 110 will be affected, and which node(s) 110 will take over for the failed node(s). This may enable system 100 to avoid a potential bottleneck, and improve processing compared to a system where a single node was designated as a coordinator node responsible for communicating failover strategy 130 to every other node in the case of failures.

In 340, a second message, including the content corresponding to the first message, is transmitted to the third node. For example, node 0 may retransmit messages m4-7 (previously transmit to node 4) to node 5, which is taking over for the failed node 4 according to an example failover strategy 130. In an embodiment, the retransmitted messages may include different header/address information, but may be include substantially similar content (e.g., data, values, operations, etc.) included in the previously transmitted messages (to the failed node). In an embodiment, messages m4 and m5 may be combined into a single message or sub-task and transmitted to node 5. The remaining nodes 0-3 and 8 may continue processing their respective subtasks without interruption or rollback even with the failure of node 4.

As noted above, multiple nodes 110 may have transmitted messages to the failed node (node 4) (e.g., in different communication algorithms, other than just scatter communication). In such an embodiment, each node 110 that transmitted a message to failed node may retransmit that message to the node that is taking over the failed node, according to the flowchart of FIG. 3. This process may occur in parallel across multiple nodes 110 of the system 100 since each node is independently notified of the failure (by MPI) and has access to failover strategy 130.

Figure 4:
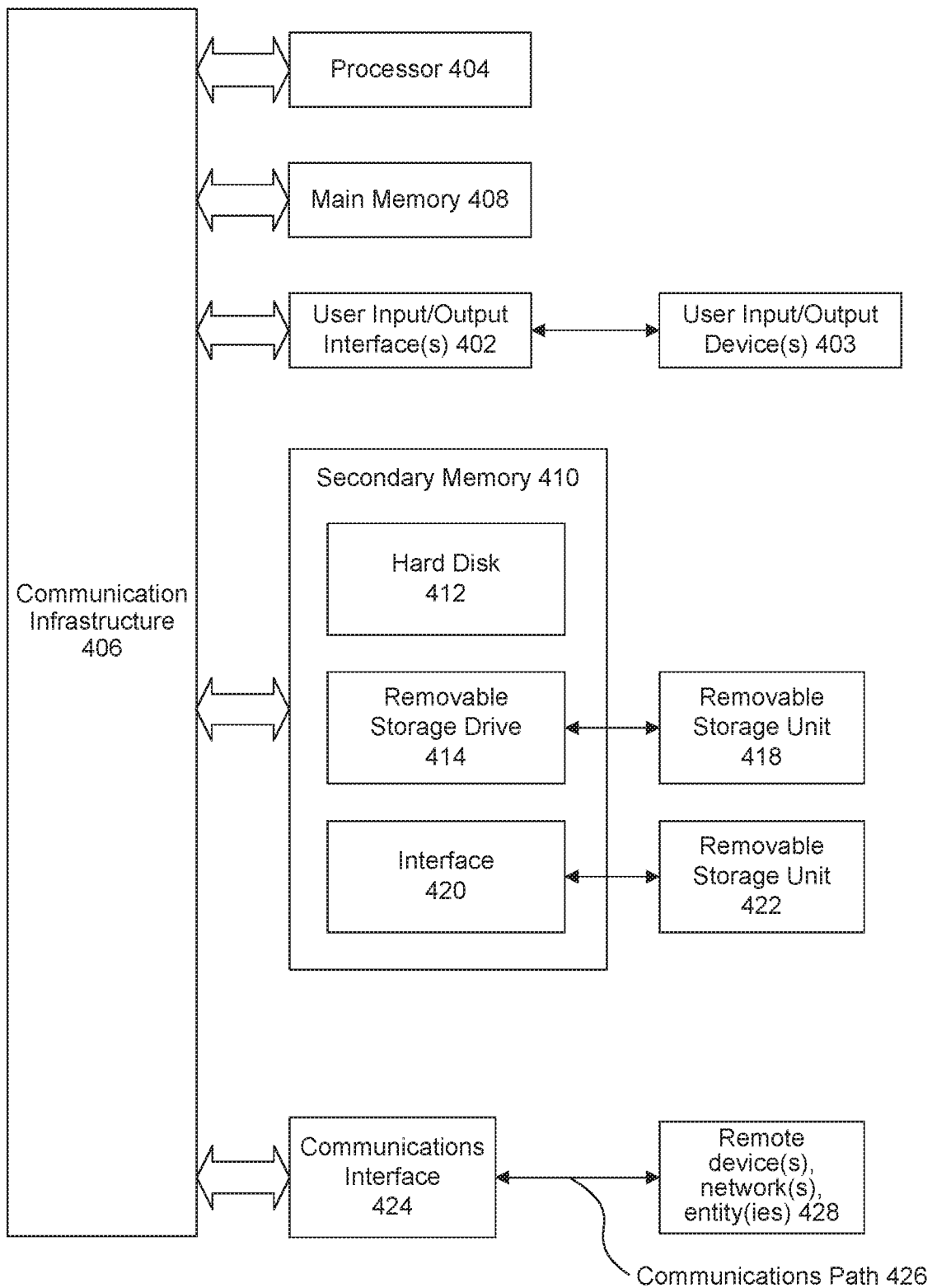
FIG. 4 is an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:
determining a first message transmitted to a first node by a second node prior to a failure of the first node of a distributed system including a plurality of nodes, wherein prior to the failure of the first node, the second node transmitted a plurality of messages to a plurality of the nodes, including the first message to the first node, wherein at least one of the plurality of messages was forwarded in accordance with instructions from the second node by an intermediary node that is communicatively coupled to the second node;
determining, by the second node, content corresponding to the first message sent to the first node by the second node, wherein the content is associated with fulfilling a request received by the distributed system;
identifying a third node to which to provide the content of the first message, and wherein the third node is identified after the failure of the first node;
transmitting a second message, including the content corresponding to the first message, to the third node.

2. The method of claim 1, wherein the failure is determined based on an indication received from a message passing interface which is facilitating communication between the nodes, and wherein both the second node and the third node receive the indication.

3. The method of claim 1, wherein the second node transmitted a third message to the third node prior to the failure.

4. The method of claim 3, wherein after the transmitting, the third node is assigned with processing content for both the second message corresponding to the first message and the third message.

5. The method of claim 4, further comprising:
receiving responses from nodes of the distributed system that have not faded, including the third node to which both the content of the first message and content of the third message have been transmitted for processing; and
providing a response to the operation based on the received responses.

6. The method of claim 1, wherein the identifying the third node comprises:
selecting the third node from among a plurality of remaining nodes of the distributed system based on at least a relative capacity of the remaining nodes, wherein the third node has a greatest relative capacity among the remaining nodes;
and reassigning the content of the first message to the third node.

7. The method of claim 1, wherein the second node transmitted at least one message to one other node of the cluster other than the first node prior to determining the failure, and wherein the other node continues processing content associated with the previously transmitted message.

8. The method of claim 1, wherein the nodes communicate using scatter communication wherein the second node transmits a message to other nodes of the distributed system, and wherein each of the other nodes receives a different message from the second node.

9. A system, comprising:
a memory, and
at least one processor coupled to the memory and configured to;
determine a first message transmitted to a first node by a second node prior to a failure of the first node of a distributed system including a plurality of nodes, wherein prior to the failure of the first node, the second node transmitted a plurality of messages to a plurality of the nodes, including the first message to the first node, wherein at least one of the plurality of messages was forwarded in accordance with instructions from the second node by an intermediary node that is communicatively coupled to the second node;
determine, by the second node, content corresponding to the first message sent to the first node by the second node, wherein the content is associated with fulfilling a request received by the distributed system;
identify a third node to which to provide the content of the first message, and wherein the third node is identified after the failure of the first node:
transmit a second message, including the content corresponding to the first message, to the third node.

10. The system of claim 9, wherein the failure is determined based on an indication received from a message passing interface which is facilitating communication between the nodes, and wherein both the second node and the third node receive the indication.

11. The system of claim 9, wherein the second node transmitted a third message to the third node prior to the failure.

12. The system of claim 11, wherein after the transmitting, the third node is assigned with processing content for both the second message corresponding to the first message and the third message.

13. The system of claim 9, wherein the processor that identifies the third node is configured to:
select the third node from among a plurality of remaining nodes of the distributed system based on at least a relative capacity of the remaining nodes, wherein the third node has a greatest relative capacity among the remaining nodes; and
reassign the content of the first message to the third node.

14. The system of claim 9, wherein the second node transmitted at least one message to one other node of the cluster other than the first node prior to determining the failure, and
wherein the other node continues processing content associated with the previously transmitted message.

15. The system of claim 9, wherein the nodes communicate using scatter communication wherein the second node transmits a message to other nodes of the distributed system, and wherein each of the other nodes receives a different message from the second node.

16. The system of claim 9, wherein the processor is further configured to:
receive responses from nodes of the distributed system that have not failed, including the third node to which both the content of the first message and content of the third message have been transmitted for processing; and provide a response to the operation based on the received responses.

17. A non-transitory computer-readable device having instructions stored thereon that, when executed by at least one computing device, causes the at least one computing device to perform operations comprising:

determining a first message transmitted to a first node by a second node prior to a failure of the first node of a distributed system including a plurality of nodes, wherein prior to the failure of the first node, the second node transmitted a plurality of messages to a plurality of the nodes, including the first message to the first node, wherein at least one of the plurality of messages was forwarded in accordance with instructions from the second node by an intermediary node that is communicatively coupled to the second node;

determining, by the second node, content corresponding to the first message sent to the first node by the second node, wherein the content is associated with fulfilling a request received by the distributed system;

identifying a third node to which to provide the content of the first message, and wherein the third node is identified after the failure of the first node;

and transmitting a second message, including the content corresponding to the first message, to the third node.

18. The non-transitory computer-readable device of claim 17, wherein the failure is determined based on an indication received from a message passing interface which is facilitating communication between the nodes, and wherein both the second node and the third node receive the indication.

19. The non-transitory computer-readable device of claim 6, wherein the second node transmitted at least one message to one other node of the cluster other than the first node prior to determining the failure; and wherein the other node continues processing content associated with the previously transmitted message.

20. The method of claim 1, wherein the identifying comprises:

determining a failover strategy indicating the third node and a fourth node which may be available to receive the content of the first message after the failure;

determining that the third node has greater available processing capacity than the fourth node, and selecting the third node to which to provide the content of the first message alter the failure.

* * * * *